A. W. LIVINGSTON.

VEHICLE WHEEL.

APPLICATION FILED JULY 1, 1914.

Reissued Nov. 3, 1914.

13,822.

2 SHEETS—SHEET 1.

WITNESSES:

Charles R. Keles

Thos. Castling.

INVENTOR

Andrew W. Livingston.

BY G. H. Strong

ATTORNEY

A. W. LIVINGSTON.

VEHICLE WHEEL.

APPLICATION FILED JULY 1, 1914.

Reissued Nov. 3, 1914.

13,822.

2 SHEETS—SHEET 2.

WITNESSES:

Charles Pickles

Thos. Castberg.

INVENTOR

Andrew W. Livingston,

BY G. H. Strong

ATTORNEY

UNITED STATES PATENT OFFICE.

ANDREW W. LIVINGSTON, OF OAKLAND, CALIFORNIA, ASSIGNOR TO STANDARD STEEL WHEEL AND TIRE ARMOR COMPANY, OF OAKLAND, CALIFORNIA, A CORPORATION OF ARIZONA.

VEHICLE-WHEEL.

13,822. Specification of Reissued Letters Patent. Reissued Nov. 3, 1914.

Original No. 1,065,537, dated June 24, 1913, Serial No. 651,200. Application for reissue filed July 1, 1914. Serial No. 848,497.

*To all whom it may concern:*

Be it known that I, ANDREW W. LIVINGSTON, citizen of the United States, residing in the city of Oakland, county of Alameda, and State of California, have invented new and useful Improvements in Vehicle-Wheels, of which the following is a specification.

This invention relates to improvements in vehicle wheels and has for its object the production of a device which is formed from a single piece of material which is so formed as to possess great strength and resistance against the dishing of a wheel that is to say the buckling thereof.

Another object of this invention is the production of a vehicle wheel which is provided with a body portion formed from a single piece of material, and bent so as to reinforce the same, and also to form efficient rim engaging means.

With these and other objects in view this invention consists of certain novel constructions, combinations, and arrangements of parts, as will be hereinafter fully described and claimed.

The invention consists of the parts and the construction and combination of parts as hereinafter more fully described and claimed, having reference to the accompanying drawings, in which—

Figure 1:
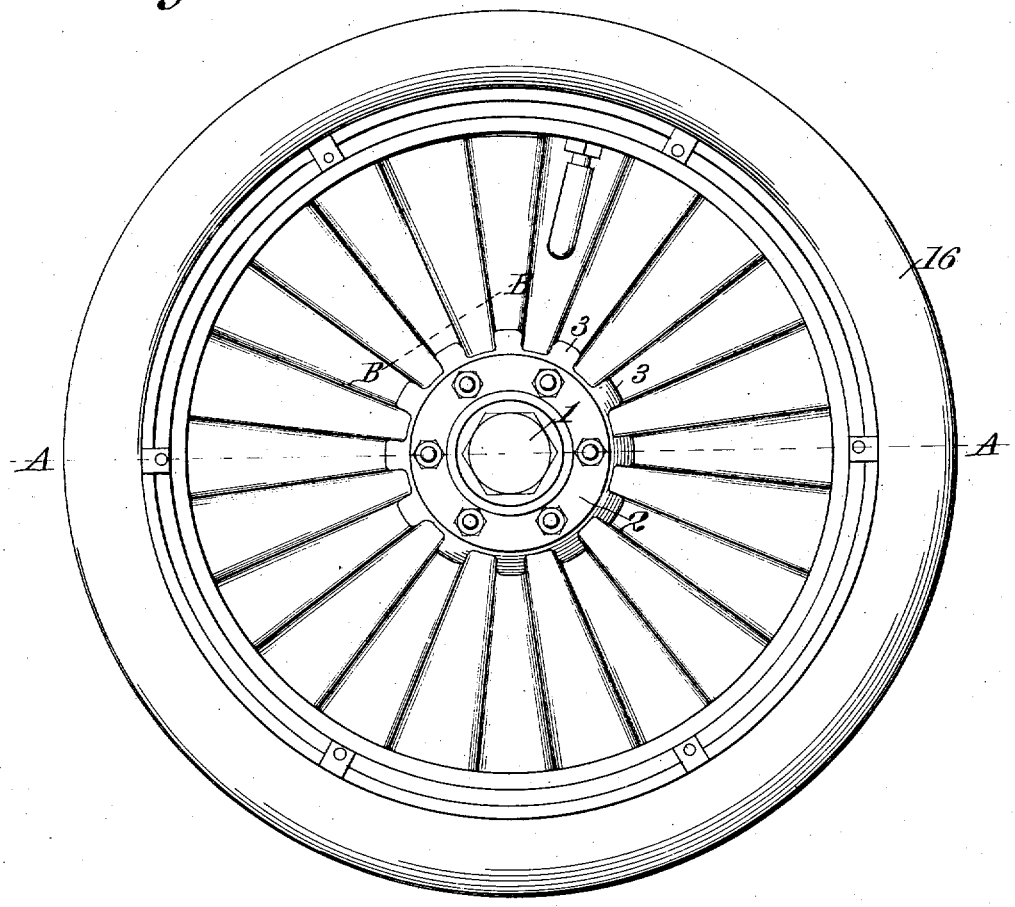
Figure 2:
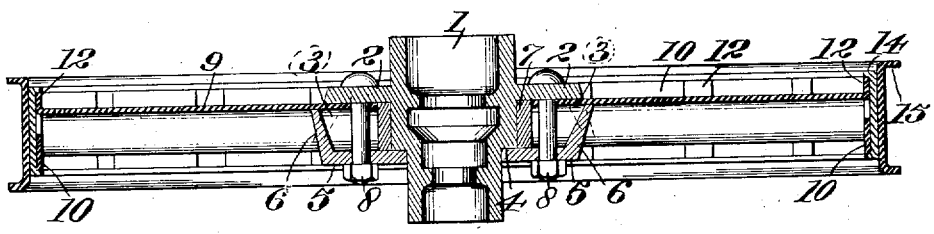
Figure 3:
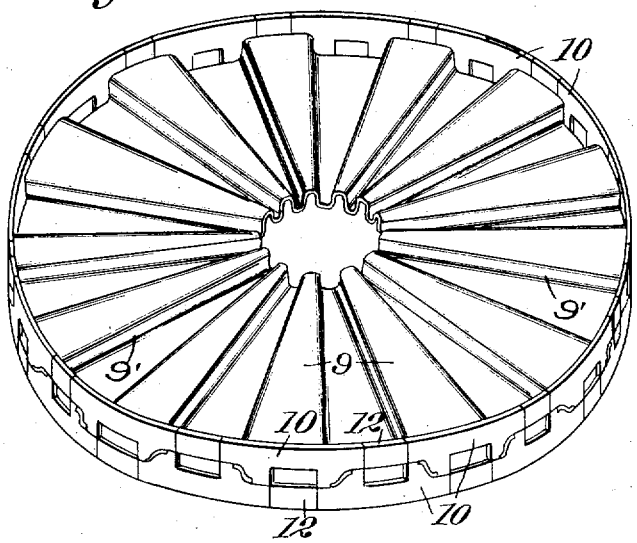
Figure 4:
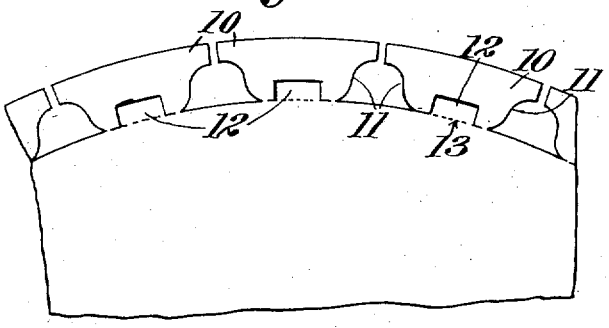
Figure 5:
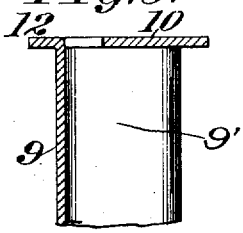
Figure 6:
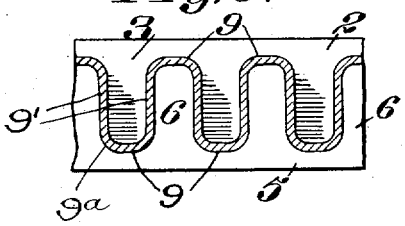

Figure 1 is a side elevation of the vehicle wheel. Fig. 2 is a transverse section taken on line A—A of Fig. 1. Fig. 3 is a perspective view of the body portion of the wheel detached from the rim and hub. Fig. 4 is a fragmentary plan view of a portion of the blank from which the body portion of the wheel is bent. Fig. 5 is a fragmentary sectional view of the body portion of the wheel showing how the rim engaging portions are bent thereon. Fig. 6 is a section taken on line B—B of Fig. 1.

Referring to the drawings by numerals 1 designates the hub which is provided intermediate its ends with a flange 2 having projecting laterally therefrom a plurality of fingers 3. The hub 1 is provided near one end with a shoulder 4 against which fits a hub-plate 5, which hub-plate like the flange 2 is provided with a plurality of fingers 6. A spacing collar 7 is positioned between the flange 2 and the plate 5, and said flange and plate are firmly held in a set position through the medium of the clamping bolts 8.

The body portion of the wheel is formed from a blank sheet which is corrugated thereby constituting ribs 9; the convolutions forming the sections or ribs 9 being of substantially the same depth from the center to the periphery of the spoke structure. As clearly shown, the wheel presents corrugations with flat bottoms flaring from the center outwardly, and with the flat bottoms on one side of the wheel lying in a plane which is substantially parallel with the plane of the flat bottoms on the other side of the wheel, and both planes lying within the plane of the wheel rim; the flat bottoms on one side being united to the flat bottoms on the other by vertical or straight walls 9′, which lie substantially in the plane of the axis of the hub opening; the point of union between the walls 9′ and the alternate bottoms being a nearly uniform or constant curve $9^a$ from the hub to the periphery. The loci of the inner and outer edges of corrugations respectively around the hub opening and around the periphery of the plate, lie in the circumferences of two concentric cylinders of substantial length to afford in one case a sufficient bearing on the hub 1 to prevent the plate rocking sidewise on the hub when slipped thereover, and similarly, to provide a substantial backing for the rim or felly portion, when the same is slipped over the plate. In other words, the construction gives a sheet metal structure with maximum width of bearing surfaces for the hub and tire. The fingers 3 and 6 fit in the dished portions of the corrugations thereby greatly strengthening the same at the junction of the body with the hub. In this way the body portion of the wheel will also be firmly locked in engagement with the hub.

The body portion is first formed from a blank sheet as illustrated in Fig. 4 having the edge thereof cut to form feet 10 which are scalloped on their ends as at 11, so as to conform to the shape of the corrugations when bent, as illustrated in Fig. 3. A lip 12 is cut from the center of each foot 10, and is bent on the line 13, in an opposite direction to the foot 10. It will be obvious that as the corrugations fit snugly against the sides 11 of the feet 10, these corrugations will be greatly reinforced at their outer ends thereby constituting a substantially rigid frame or body portion formed from a cheap and easily manufactured blank. It will, of course, be obvious that these feet 10 are alternately bent in opposite directions so as to accommodate the shape of the corrugations. This feature is clearly illustrated in Fig. 3 of the drawings.

The lip 12 and the foot 10 are secured to a channel band 14 which is shrunk upon the outer edge of the body of the wheel in any suitable manner. This channel band is connected to a rim 15 of any suitable construction for the reception of the ordinary tire 16.

From the foregoing description, it will be readily obvious that the entire device may be stamped from sheet metal owing to the fact that it is not necessary to provide any separate means for connecting the outer edge of the body with the rim.

Having thus described my invention what I claim and desire to secure by Letters Patent is—

1. A wheel element comprising a single piece of sheet metal having a central opening with a circumferential series of radial corrugations extending the radial depth of the plate, said corrugations having flat bottoms flaring from the center of the plate outwardly and with the flat bottoms on one side of the wheel lying in a plane which is substantially parallel with the plane of the flat bottoms on the other side of the wheel.

2. A wheel element comprising a single piece of sheet metal having a central opening with a circumferential series of radial corrugations extending the radial depth of the plate, said corrugations having flat bottoms flaring from the center of the plate outwardly and with the flat bottoms on one side of the wheel lying in a plane which is substantially parallel with the plane of the flat bottoms on the other side of the wheel, the flat bottoms on one side being united to the flat bottoms on the other side by straight walls which lie substantially in the plane of the axis of the opening.

3. A wheel element comprising a metal plate with a central opening to receive a hub the entire body of said plate having pressed therein a series of radially flared corrugations which start at the hub opening and are substantially of uniform depth from their inner to their outer ends, and extending the entire radial depth of the plate, the loci of the inner and outer edges of the corrugations, respectively, around the hub opening and around the periphery of the plate lying in the circumferences of two concentric cylinders of substantial length, to afford a sufficient bearing on the hub to prevent the plate rocking sidewise on a hub when slipped thereover and similarly to provide a substantial backing for a rim to support the latter when the same is slipped over the plate.

4. A spoke structure for a wheel provided with radial corrugations, the convolutions forming the corrugations being of substantially the same depth from the center to the periphery of the spoke structure, substantially as described.

5. A spoke structure for a wheel provided with radial corrugations, the convolutions forming the corrugations being of substantially the same depth from the center to the periphery of the spoke structure, said corrugations having flat flared bottoms with substantially straight sides.

In testimony whereof I have hereunto set my hand in the presence of two subscribing witnesses.

ANDREW W. LIVINGSTON.

Witnesses:
I. M. HANSEN,
SEG. GENZBERGER.